(12) United States Patent
Armbruster

(10) Patent No.: US 6,314,912 B1
(45) Date of Patent: Nov. 13, 2001

(54) WINDOW-MOUNTED BIRD OBSERVATORY ASSEMBLY AND METHOD OF CONSTRUCTING THE ASSEMBLY

(76) Inventor: Franz O. Armbruster, 18599 E. Louisiana Ave., Aurora, CO (US) 80017

(*) Notice: Subject to any disclaimer, the term of this patent is extended or adjusted under 35 U.S.C. 154(b) by 0 days.

(21) Appl. No.: 09/312,989

(22) Filed: May 17, 1999

(51) Int. Cl.$^7$ .......................... A01K 31/00; A01K 31/14
(52) U.S. Cl. .......................... 119/428; 119/431
(58) Field of Search ..................... 119/428, 429, 119/432, 433, 434, 435, 257, 459, 467, 52.2, 57.8; 248/467, 683, 206.5

(56) References Cited

U.S. PATENT DOCUMENTS

| | | | |
|---|---|---|---|
| 388,385 | * | 8/1888 | Wooster ........................ 119/428 |
| 3,239,178 | * | 3/1966 | Pompa ........................ 248/205.3 |
| 3,282,251 | * | 11/1966 | Dahmus ........................ 119/428 |
| 3,291,100 | * | 12/1966 | Negaard ........................ 119/57.8 |
| 4,100,684 | * | 7/1978 | Berger ........................ 35/62 |
| 4,881,491 | * | 11/1989 | Brown ........................ 119/51.01 |
| 4,953,503 | | 9/1990 | Lundquist ........................ 119/51.01 |
| 5,016,571 | | 5/1991 | Totaro ........................ 119/23 |
| 5,170,747 | | 12/1992 | Strangio ........................ 119/23 |
| 5,479,877 | * | 1/1996 | Demboske ........................ 119/23 |
| 5,493,997 | | 2/1996 | Ritchey ........................ 119/23 |
| 5,551,657 | | 9/1996 | Liethen ........................ 248/205.2 |
| 5,904,330 | * | 5/1999 | Manico et al. ........................ 248/206.3 |

FOREIGN PATENT DOCUMENTS

2040662 * 9/1980 (GB) ........................ 119/428

* cited by examiner

*Primary Examiner*—Peter M. Poon
*Assistant Examiner*—Son T. Nguyen
(74) *Attorney, Agent, or Firm*—Flanagan & Flanagan; John R. Flanagan; John K. Flanagan

(57) ABSTRACT

A bird observatory assembly includes an enclosure, an annular mounting frame and complementary first and second magnetic elements. The enclosure has a plurality of panels interconnected to one another and to the mounting frame so as to define an interior cavity for one or more birds to nest within the enclosure and an opening at an inner end of the enclosure. One of the panels has an aperture defined therein that permits birds to enter and exit the interior cavity. The mounting frame has a surface positioned adjacent to an exterior surface of a window pane. The mounting frame is mounted to the inner end of the enclosure and defines a viewing portal in communication with the opening of the enclosure and the interior cavity. The first magnetic elements are mounted to the surface of the mounting frame. The second magnetic elements are mounted to the exterior surface of the window pane such that the first and second magnetic elements are alignable with and magnetically attract one another so as to retain the mounting frame and enclosure on the exterior surface of the window pane. Birds within the interior cavity of the enclosure can be seen through the window pane and the viewing portal of the mounting frame and the opening of the enclosure.

13 Claims, 3 Drawing Sheets

WINDOW-MOUNTED BIRD OBSERVATORY ASSEMBLY AND METHOD OF CONSTRUCTING THE ASSEMBLY

This patent application claims the benefit of U.S. provisional patent application No. 60/086,050, filed May 19, 1998.

BACKGROUND OF THE INVENTION

1. Field of the Invention

The present invention generally relates to birdhouse constructions and, more particularly, is concerned with a window-mounted bird observatory assembly and method of constructing the assembly.

2. Description of the Prior Art

Many people enjoy observing birds. Nesting boxes or birdhouses are structures which people build and mount at suitable locations where they desire birds to live. A birdhouse generally provides a substantially enclosed space for a bird to nest and hatch her eggs and raise baby birds. Birdhouses are a common way for people to attract birds to live near them and to observe birds. Many birdhouses, however, do not permit people to conveniently view the birds when they are inside the birdhouse. As a result, some birdhouses have been developed over the years which do allow birds inside them to be seen from outside.

Representative examples of the prior art birdhouses and the like which enable people to more easily observe birds nested inside them are disclosed in U.S. Pat. No. 4,953,503 to Lundquist, U.S. Pat. No. 5,016,571 to Totaro, U.S. Pat. No. 5,170,747 to Strangio, U.S. Pat. No. 5,493,997 to Ritchey and U.S. Pat. No. 5,551,657 to Liethen. The Lundquist, Strangio, Ritchey and Liethen patents employ either suction cups, adhesive tape, glue or mateable hook and loop fastening material to mount a birdhouse or a structure for mounting a birdhouse or the like to a window pane. The Totaro, Strangio and Ritchey patents provide a one-way viewing window which allows a person on an opposite side of the window pane to look into the birdhouse without being noticed by the birds inside. The Strangio and Ritchey patents also provide an opaque cover for covering the one-way viewing window. The Strangio and Ritchey patents employ either adhesive tape, glue or mateable hook and loop fastening material to mount the one-way viewing window to the window pane opposite from the birdhouse and to mount the opaque cover to the one-way viewing window.

Problems exist, however, with the above-mentioned prior art means for mounting birdhouses and the like to window panes. Suction cups are susceptible to failure because sunlight can damage the material comprising the cups and cold temperatures can affect the resiliency of the material. Mateable hook and loop fastening material is expensive and tends to be thick in cross-section and thereby increases a distance between the window pane and the birdhouse and must be precisely aligned for maximum holding strength. Adhesive tape and glue alone are generally not reliable.

Consequently, a need remains for an assembly which provides a solution to the aforementioned problems in the prior art without introducing any new problems in place thereof.

SUMMARY OF THE INVENTION

The present invention provides a bird observatory assembly designed to satisfy the aforementioned need. The bird observatory assembly of the present invention is window-mountable by employing a magnetic mounting system. The magnetic mounting system includes complementary first and second magnetic elements. The first magnetic elements are mounted to a mounting frame of the assembly. The second magnetic elements are mounted to an exterior surface of a window pane such that the first and second magnetic elements are alignable with and magnetically attract one another and retain the mounting frame and an enclosure of the assembly on the exterior surface of the window pane. The first and second magnetic elements are not susceptible to failure due to sunlight damage nor does cold temperatures adversely affect the resiliency of the system. The first and second magnetic elements are relatively inexpensive and need not be precisely aligned for maximum holding strength.

Accordingly, the present invention is directed to a bird observatory assembly which comprises: (a) an enclosure formed by a plurality of panels being interconnected to one another so as to define an interior cavity for one or more birds to nest within the enclosure, the enclosure having opposite inner and outer ends with the inner end defining an opening communicating with the interior cavity, the plurality of panels including one panel defining an aperture communicating with the interior cavity so as to permit birds to enter and exit the interior cavity via the aperture; (b) a mounting frame having a surface positionable adjacent to an exterior surface of a window pane, the mounting frame mounted to the enclosure at the inner end thereof and defining a viewing portal in communication with the opening defined at the inner end of the enclosure; and (c) means for magnetically mounting the mounting frame at the surface thereof to the exterior surface of the window pane to thereby retain the mounting frame and the enclosure on the exterior surface of the window pane such that birds within the interior cavity of the enclosure can be seen through the window pane via the viewing portal of the mounting frame and the opening of the enclosure. More particularly, the plurality of panels includes another panel which partially closes the inner end of the enclosure in defining the opening at the inner end thereof. The magnetic mounting means includes at least a pair of complementary first and second magnetic elements. The first magnetic element is mounted to the surface of the mounting frame. The second magnetic element is mounted to the exterior surface of the window pane such that the first and second magnetic elements are alignable with and magnetically attract one another and retain the mounting frame and the enclosure on the exterior surface of the window pane.

The present invention is also directed to a bird observatory assembly which comprises: (a) an enclosure formed by a plurality of panels being interconnected to one another so as to define an interior cavity for one or more birds to nest within the enclosure; (b) a plurality of perforated concentric panel segments of varying diameters defined in one panel of the plurality of panels and being selectively removable so as to define an aperture in the one panel communicating with the interior cavity and having a selected diameter size permitting birds of selected sizes to enter and exit the interior cavity of the enclosure; and (c) means for mounting the enclosure to a support structure.

The present invention is further directed to a method for constructing a bird observatory, comprising the steps of: (a) providing a mounting frame defining a viewing portal and having opposite front and rear surfaces; (b) mounting a first panel to the front surface of the mounting frame such that the viewing portal is partially covered, the first panel having a plurality of angularly displaced peripheral edges; (c) mounting additional panels to the mounting frame and first panel and to one another using the peripheral edges of the first panel as guides so as to thereby form an enclosure mounted to the mounting frame and defining an interior cavity within the enclosure for one or more birds to nest within the enclosure and an opening in an inner end of the enclosure adjacent to and communicating with the interior cavity of the enclosure and the viewing portal of the mounting frame; (d) forming an aperture in one of the additional panels of the enclosure in communication with the interior cavity of the enclosure for permitting birds to enter and exit the interior cavity; and (e) mounting the mounting frame at the rear surface thereof to a support structure to retain the mounting frame and the enclosure on the support structure such that birds within the interior cavity of the enclosure can be seen through the viewing portal of the mounting frame and the opening at the inner end of the enclosure. More particularly, the mounting of the mounting frame includes providing complementary magnetic elements on the rear surface of the mounting frame and exterior surface of a window pane to thereby retain the mounting frame and the enclosure on the exterior surface of the window pane such that birds within the interior cavity of the enclosure can be seen through the window pane and the viewing portal of the mounting frame and the opening of the enclosure.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
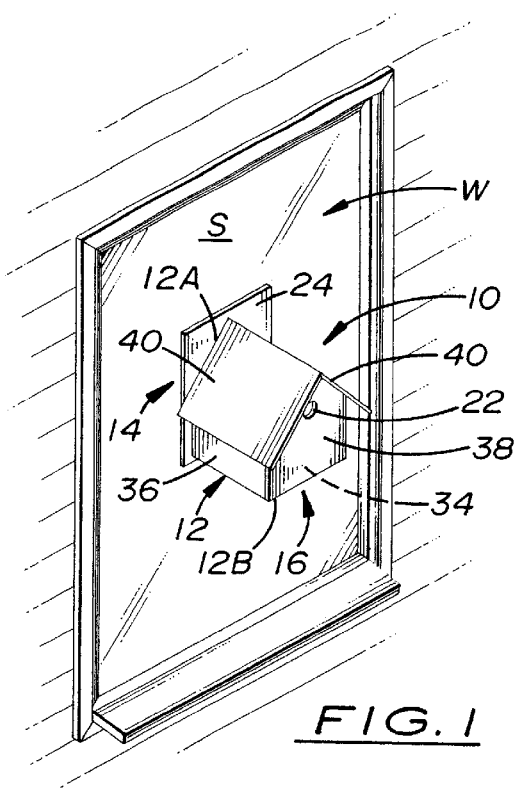
FIG. 1 is a perspective view of a bird observatory assembly of the present invention mounted to an exterior surface of a window pane.
Figure 2:
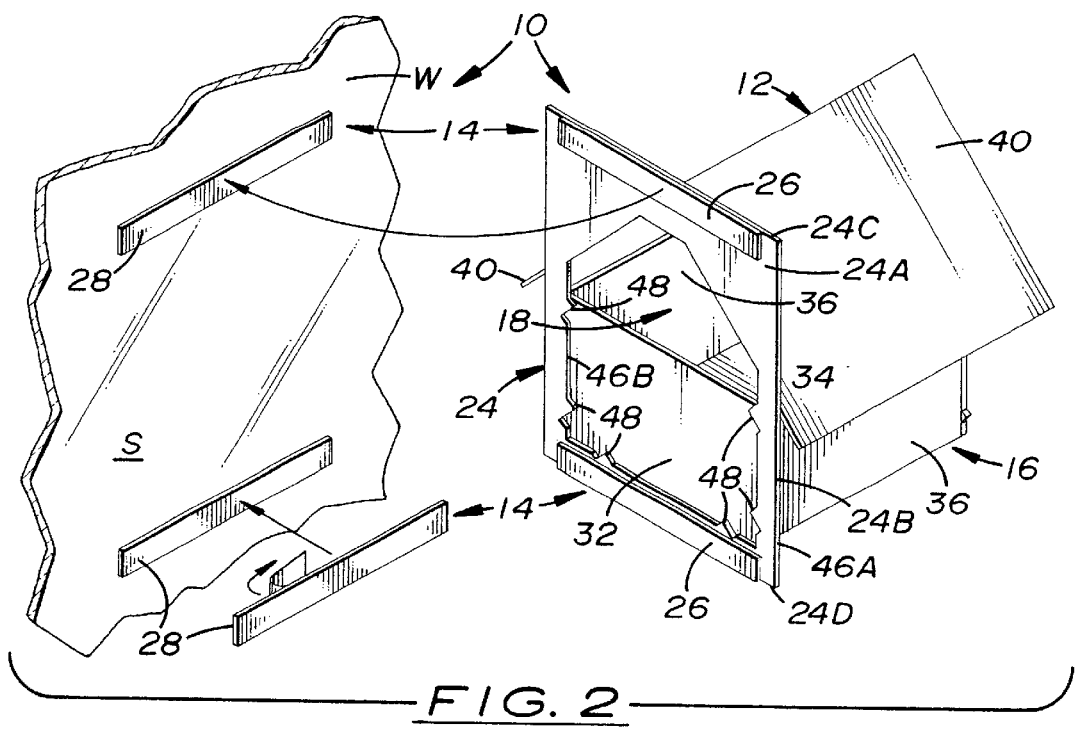
FIG. 2 is an enlarged perspective view of the bird observatory assembly removed from the window pane to show two pairs of first and second strips of complementary magnetic material with the first strips mounted to a mounting frame of the assembly and the second strips mounted to an exterior surface of the window pane such that the first and second strips are alignable with and magnetically attract one another to thereby retain the mounting frame and the enclosure on the exterior surface of the window pane.

Referring to the drawings and particularly to FIGS. 1 and 2, there is illustrated a bird observatory assembly, generally designated 10, of the present invention. Basically, the bird observatory assembly 10 includes an enclosure 12 and a mounting means 14 for mounting the enclosure 12 to a support structure, such as an exterior surface S of a window pane W. The enclosure 12 has a plurality of panels 16 interconnected to one another and to the mounting means 14 so as to define an interior cavity 18 for one or more birds (not shown) to nest within the enclosure 12 and an opening 20 at an inner end 12A of the enclosure 12. Also, one of the plurality of panels 16 has an aperture 22 defined therein that permits birds to enter and exit the interior cavity 18. The mounting means 14 preferably includes a mounting frame 24 in the form of flat shaped panel and magnetic mounting means in the form of complementary pairs of first and second magnetic elements 26, 28. The mounting frame 24 has a rear surface 24A for positioning adjacent to the exterior surface S of the window pane W. The mounting frame 24 is mounted to the inner end 12A of the enclosure 12 and defines a viewing portal 30 in communication with and extending generally parallel to the opening 20 at the inner end 12A of the enclosure 12 and the interior cavity 18. The first magnetic elements 26 are mounted to the rear surface 24A of the mounting frame 24. The second magnetic elements 28 are mounted to the exterior surface S of the window pane W such that the first and second magnetic elements 26, 28 are alignable with and magnetically attract one another so as to retain the mounting frame 24 and enclosure 12 on the exterior surface S of the window pane W. Birds within the interior cavity 18 of the enclosure 12 can be seen through the window pane W and the viewing portal 30 of the mounting frame 24 and the opening 20 at the inner end 12A of the enclosure 12.

Referring now to FIGS. 1, 2 and 4 to 9, more particularly in the enclosure 12 of the assembly 10, the plurality of panels 16 preferably are seven in number and include a rear panel 32, a bottom panel 34, a pair of opposite side panels 36, a front panel 38 and a pair of roof panels 40. Each of the rear, bottom, side and roof panels 32, 34, 36, 40 has a substantially flat rectangular configuration. The front panel 38 has a substantially flat configuration. Each of the panels 32, 34, 36, 38, 40 can be made of a 3 mm luan type of wood; however, they can be made of any other suitable material. As an example only, and not as a limitation, the panels 32, 34, 36, 38, 40 can have the following dimensions. The rear panel 32 can have a height of 4 inches and a length of 6.5 inches. The bottom panel 34 can have a width of 6.5 inches and a length of 7 inches. Each side panel 36 can have a height of 5 inches and a length of 7 inches. Each roof panel 40 can have a width of 7 inches and a length of 8.5 inches. The front panel 38 has an upper portion 38A and a lower portion 38B. The upper portion 38A has a substantially triangular configuration while the lower portion 38B has a substantially rectangular configuration. The lower portion 38B also has a height about one-half inch greater than the height of a side panel 36 and a length of 6.5 inches.

In addition to the inner end 12A, the enclosure 12 has an opposite outer end 12B. The inner end 12A is at the rear of the enclosure 12 while the outer end 12B is at the front of the enclosure 12. The rear panel 32 is disposed at and partially closes the inner end 12A of enclosure 12 in defining the opening 20 of the enclosure 12 at the inner end 12A. The opening 20 has substantially the same triangular shape as the upper portion 38A of the front panel 38. The opening 20 above the rear panel 32 is in communication with the interior cavity 18. The rear panel 32 can be termed a "modesty" panel which allows birds within the interior cavity 18 to have some degree of privacy below the opening 20 and behind the rear panel 32. The front panel 38 of the enclosure 12 is disposed at and substantially closes the outer end 12B of the enclosure 12.

Referring to FIGS. 1, 4–6, 9 and 10, the aperture 22 of the enclosure 12 is defined in the front panel 38 thereof in communication with the interior cavity 18 of the enclosure 12. The aperture 22 is disposed immediately above approximately where the upper and lower portions 38A, 38B of the front panel 38 meet. The aperture 22 is provided in communication with the interior cavity 18 and permits birds to enter and exit the interior cavity 18. The front panel 38 includes a plurality of concentric panel segments 42 separated by perforations 44 and having varying diameters such that selected ones of the segments 42 are removable, proceeding from the innermost or central segment 42A to the middle segment 42B and then to the outermost segment 42C to form the aperture 22 having a selected one of the varying diameter sizes. The circular segments 42 are, preferably, three in number. The front panel 38 may be punched along the perforations 44 encompassing the selected ones of the segments 42 to form the aperture 22 with the desired diameter. The aperture 22 having a selected one of the different diameter sizes can be formed this way to tailor the assembly 10 to permit birds of a selected corresponding size to enter and exit the interior cavity 18 of the enclosure 12.

The front panel 38 of the enclosure 12 also has an interior surface 38C which is textured below the aperture 22 of the enclosure 12 to enable the feet of birds within the interior cavity 18 to securely grip the interior surface 38C for climbing up to the aperture 22. The interior surface 38C is roughened in any suitable fashion to form the desired texture. The textured surface can be referred to as a chick ladder.

Figure 5:
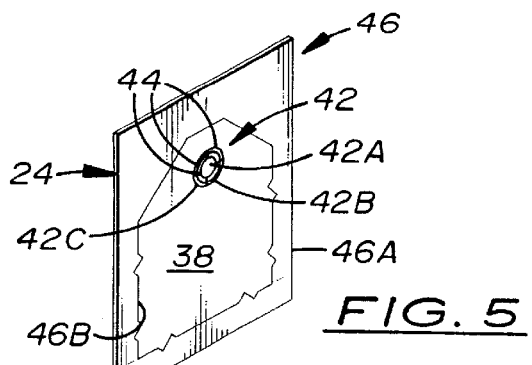
FIGS. 5 to 10 are a sequence of perspective views showing the steps in a method of constructing the assembly.
Figure 6:
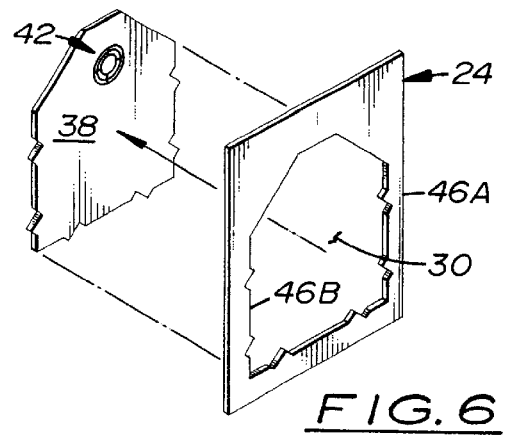

Referring now to FIGS. 5 and 6, it can be seen that the mounting frame 24 of the mounting means 14 and the front panel 38 of the enclosure 12 are initially provided together in the form of a single large construction panel 46 which has a substantially flat configuration and can be made of the same material as the plurality of panels 16. The construction panel 46 has an outer peripheral edge 46A of a substantially rectangular configuration and an inner perforation defining an inner peripheral edge 46B spaced interiorly of the outer peripheral edge 46A. The mounting frame 24 is provided upon punching of the front panel 38 from the large construction panel 46 along the inner perforation. The removal of the front panel 38 leaves the large viewing portal 30 in the mounting frame 24 surrounded by the inner peripheral edge 46B and having the same configuration and size as the front panel 38. The portal 30 is in communication with the opening 20 of the enclosure 12 such that birds within the interior cavity 18 of the enclosure 12 can be seen through the window pane W via the portal 30 and the opening 20 of the enclosure 12. The configuration of the portal 30 and front panel 38 substantially conform to the vertical cross-sectional configuration of the enclosure 12. The mounting frame 24 has a height greater than its width. The width of the mounting frame 24 is greater than the width of the rear panel 32 of the enclosure 12. The height of the mounting frame 24 is greater than the height of the front panel 38 of the enclosure 12. Each roof panel 40 of the enclosure 12 has a portion which extends slightly beyond the outer peripheral edge 46A of the mounting frame 24.

Figure 3:
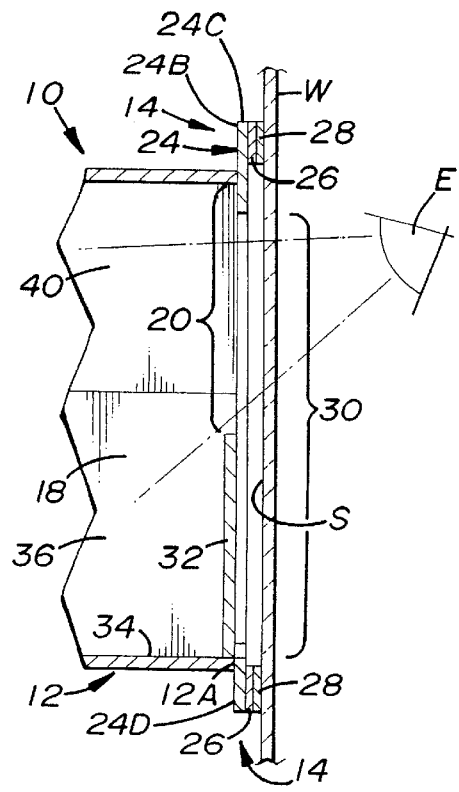
FIG. 3 is an enlarged fragmentary vertical sectional view depicting the observation of an interior cavity of the assembly through a viewing portal in the mounting frame of the assembly and through the window pane.
Figure 7:
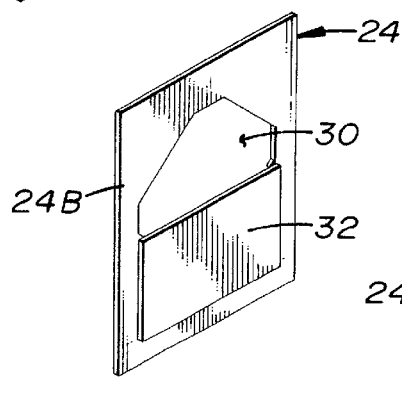

In addition to its rear surface 24A, the mounting frame 24 has a front surface 24B. The mounting frame 24 is mounted at its rear surface 24A to the exterior surface S of the window pane W and at its front surface 24B to the enclosure 12 at the inner end 12A thereof. As seen in FIG. 7, the rear panel 32 of the enclosure 12 is attached to a lower portion of the mounting frame 24 so as to partially cover a lower portion the viewing portal 30 and leave an uncovered upper portion having the same configuration as the opening 20 at the inner end of the enclosure 12. Thus, the uncovered upper portion of the portal 30 and the opening 20 extend generally parallel to one another and have substantially the same triangular shape as the upper portion 38A of the front panel 38. The portal 30 communicates with the interior cavity 18 via the opening 20 of the enclosure 12 above the rear panel 32 thereof. In FIG. 3 is depicted an observer's eye E viewing the interior cavity 18 through the transparent window pane W via the viewing portal 30 of the mounting frame 24 and the opening 20 of the enclosure 12.

Figure 4:
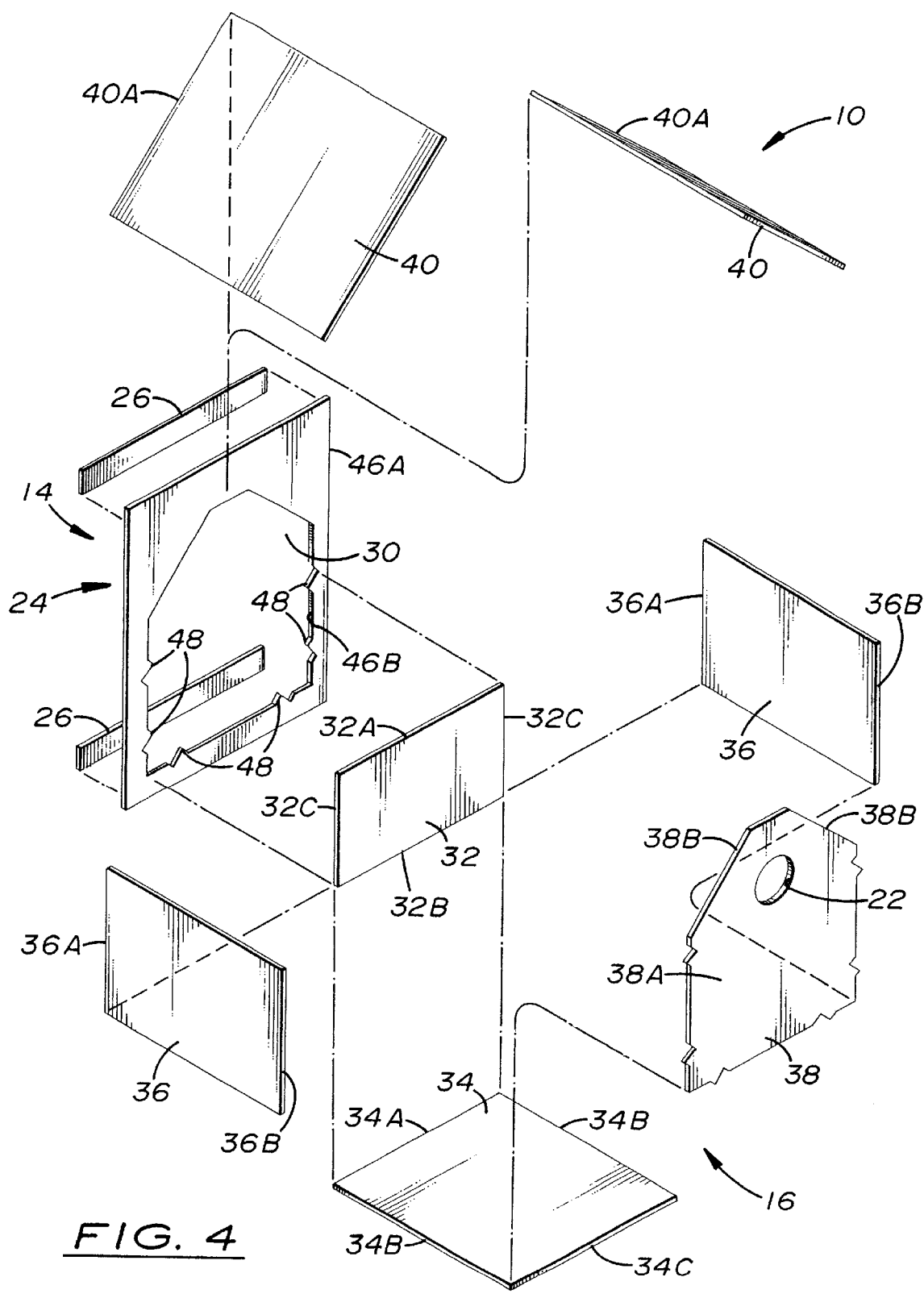
FIG. 4 is an exploded view of the assembly of FIG. 1.

Referring now to FIGS. 2 and 4, as mentioned above the mounting means 14 of the assembly 10 also includes the first and second magnetic elements 26, 28 for magnetically mounting the mounting frame 24 at its rear surface 24A to the exterior surface S of the window pane W to retain the mounting frame 24 and the enclosure 12 on the exterior surface S of the window pane W such that birds within the interior cavity 18 of the enclosure 12 can be seen through the window pane W as just explained above. The first magnetic element 26 preferably is in the form of a pair of first strips 26 of magnetic material. The first strips 26 are mounted to the rear surface 24A of the mounting frame 24 adjacent to upper and lower edges 24C, 24D of the mounting frame 24 above and below the portal 30. The first strips 26 adhere to the mounting frame 24 by the means of any suitable adhesive applied on the first strips 26 and brought into contact with the rear surface 24A of the mounting frame 24. The second magnetic element 28 preferably is in the form of a pair of second strips 28 of magnetic material, substantially identical to the first strips 26. The second strips 28 are mounted and adhere to the exterior surface S of the window pane W by the means of any suitable adhesive applied on the second strips 28 and brought into contact with the exterior surface S of the window pane W. The magnetic material of the second strips 28 are complementary to the magnetic material of the first strips 26 and the second strips 28 are positioned in a similar arrangement as the first strips 26 such that paired first and second strips 26, 28 are alignable with and magnetically attracted to one another to thereby retain the mounting frame 24 and the enclosure 12 attached thereon magnetically secured on the exterior surface S of the window pane W, as seen in FIGS. 1 and 2.

Referring now to FIGS. 4 to 10, there is depicted a method of constructing the assembly 10. The first and second magnetic elements 26, 28 are mounted by any suitable means, such as glue, to the rear surface 24A of the mounting frame 24 and to the exterior surface S of the window pane W. The mounting frame 24 and front panel 38 of the construction panel 46 are separated from one another. A hobby knife or any other suitable cutting instrument (not shown) may be employed to cut along the inner perforation to assist in separating the front panel 38 from the mounting frame 24. Then, a piece of wax paper or the like (not shown) is placed on a flat surface, such as on a cutting board. The mounting frame 24 is placed with its rear surface 24A down on the wax paper. Glue, or any other suitable adhesive substance, is placed on the front surface 24B of the mounting frame 24 adjacent to the inner peripheral edge 46B at six spaced apart points 48 and then the rear panel 32 is placed on the front surface 24B of the mounting frame 24 such that the rear panel 32 contacts the glue at each of the six points 48 and is thereby secured to the mounting frame 24 and disposed over and covers the lower portion of the viewing portal 30 of the mounting frame 24, as shown in FIG. 7. The rear panel 32 should be pressed onto the front surface 24B of the mounting frame 24, such as by placement of any suitable weight thereon. At least twenty minutes should pass before moving to the next step to allow the glue to get tacky, though it need not be completely dry. The rear panel 32 has a plurality of angularly displaced peripheral edges—upper edge 32A, lower edge 32B and a pair of opposite side edges 32C—which are used as guides for proper placement of the bottom panel 34 and side panels 36 against the rear panel 32 in forming the enclosure 12.

Figure 8:
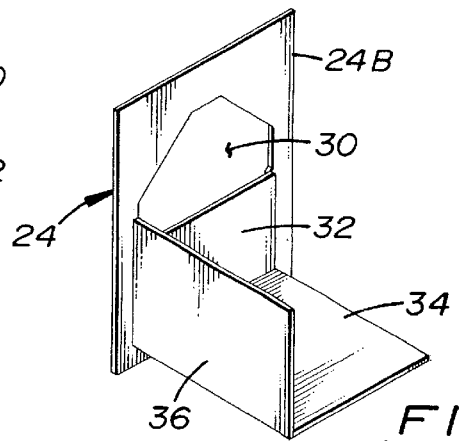

Next, a line of glue is placed along one side edge 32C and the lower edge 32B of the rear panel 32 and on the front surface 24B of the mounting frame 24 adjacent thereto. Rear end edges 34A, 36A of the bottom panel 34 and one of the side panels 36 are placed on the front surface 24B of the mounting frame 24 and against the corresponding lower and side edges 32B, 32C of the rear panel 32 such that the end edges 34A, 36A of the bottom panel 34 and one side panel 36 contact the glue and are thereby secured to the rear panel 32 and the mounting frame 24. The bottom panel 34 and one side panel 36 are disposed in substantially perpendicular relation to the mounting frame 24, as shown in FIG. 8. A drop of glue is placed at the juncture of the bottom panel 34 with the one side panel 36 to secure them to one another. The one side panel 36 may be disposed slightly inside of an adjacent side edge 34B of the bottom panel 34. One or more pieces of tape may be temporarily applied to the bottom panel 34 and the one side panel 36 to hold them together while the glue dries. At least ten minutes should pass before moving to the next step.

Figure 9:
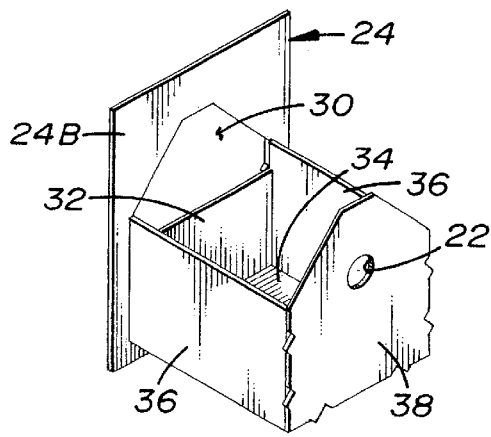

Following next, a line of glue is placed along the other side edge 32C of the rear panel 32 and on the front surface 24B of the mounting frame 24 adjacent thereto. A rear end edge 36A of the other side panel 36 is placed on the front surface 24B of the mounting frame 24 and against the other side edge 32C of the rear panel 32 such that the rear end edge 36A of the other side panel 36 contacts the glue and is thereby secured to the rear panel 32 and the mounting frame 24. The other side panel 36 is disposed in substantially parallel relation to the one side panel 36 and in substantially perpendicular relation to the bottom panel 34 and to the mounting frame 24, as shown in FIG. 9. A drop of glue is placed at the juncture of the bottom panel 34 and the other side panel 36 to secure them to one another. The other side panel 36 may be disposed slightly inside of an adjacent side edge 34B of the bottom panel 34. One or more pieces of tape may be temporarily applied to the bottom panel 34 and the other side panel 36 to hold them together while the glue dries. At least ten minutes should pass before moving to the next step.

The front panel 38 is punched along the perforations 44 of one of the segments 42 to form the aperture 22 of the desired diameter. Glue is placed on front end edges 34C, 36B of the bottom panel 34 and the side panels 36 and the front panel 36 is placed at its lower portion 38B on the front end edges of the bottom panel 34 and the side panels 36 such that the front panel 38 contacts the glue and is thereby secured to the bottom panel 34 and the side panels 36. The front panel 38 is disposed in substantially parallel relation to the rear panel 32 and the mounting frame 24 and substantially perpendicular relation to the bottom panel 34 and the side panels 36, as shown in FIG. 9. One or more pieces of tape may be temporarily applied to the front panel 38 and the side panels 36 to hold them together while the glue dries. The front panel 38 should be pressed onto the end edges 34C, 36B of the bottom panel 34 and the side panels 36, such as by placement of any suitable weight thereon. Allow the glue to dry thoroughly. One hour should pass before moving to the final step.

Figure 10:
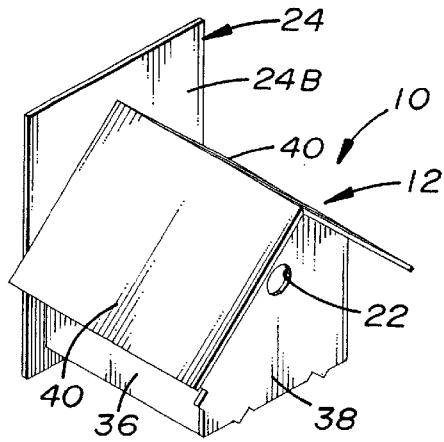

Lastly, glue is placed on the sloping top edges 38B of the front panel 38 along its upper portion 38A. Glue is also placed on the front surface 24B of the mounting frame 24 adjacent to the inner peripheral edge 46B where the inner peripheral edge 46B is angled. Rear end edges of the roof panels 40 are placed on the front surface 24B of the mounting frame 24 and interior portions of the roof panels 40 are placed against the sloping top edges 38B of the front panel 38 along its upper portion 38A such that the rear end edges 46A and interior portions of the roof panels 40 contact the glue and are thereby secured to the front panel 38 and the mounting frame 24. The roof panels 40 are disposed in substantially perpendicular relation to the front panel 38 and the mounting frame 24 and at an acute angle in relation to one another, as shown in FIG. 10. The glue should be allowed to dry before the assembly 10 is moved. Gaps between or misalignment of the plurality of panels 16 are not a problem, but instead have the effect of enticing a mother bird to fill them with nesting material. One or more birds may nest inside the interior cavity 18 of the enclosure 12 and may be viewed through the window pane W, via the portal 30 of the mounting frame 24 and the opening 20 of the enclosure 12.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A bird observatory assembly, comprising:
   (a) a mounting frame having one surface positionable adjacent to an exterior surface of a window pane, said mounting frame defining a viewing portal;
   (b) an enclosure formed by a plurality of panels being interconnected to one another so as to define an interior cavity for one or more birds to nest within said enclosure, said enclosure having opposite inner and outer ends, said plurality of panels including one panel defining an aperture communicating with said interior cavity so as to permit birds to enter and exit said interior cavity via said aperture, said plurality of panels further including another panel fixedly attached to said mounting frame at another surface thereof opposite to said one surface thereof and being disposed at and partially closing said inner end of said enclosure and extending across a lower portion of said viewing portal of said mounting frame so as to define an opening above said another panel at said inner end of said enclosure adjacent to and generally parallel and in communication with an uncovered upper portion of said viewing portal of said mounting frame; and
   (c) means for mounting said mounting frame at said one surface thereof to the exterior surface of the window pane to thereby retain said mounting frame and said enclosure on the exterior surface of the window pane such that birds within said interior cavity of said enclosure can be seen through the window pane via said upper portion of said viewing portal of said mounting frame and said opening of said enclosure above said another panel thereof.

2. The assembly of claim 1 wherein said plurality of panels of said enclosure are seven in number.

3. The assembly of claim 1 wherein said one panel of said enclosure has an interior surface textured below said aperture therein such that feet of birds within said interior cavity of said enclosure may grip said textured interior surface of said one panel to facilitate climbing up to said aperture.

4. The assembly of claim 1 wherein said aperture in said one panel of said enclosure is formed by removal of at least one of a plurality of removable perforated concentric panel segments of varying diameters formed in said one panel so as to permit birds of selected sizes to enter and exit said interior cavity of said enclosure.

5. The assembly of claim 1 wherein said one panel is disposed at said outer end of said enclosure opposite from said inner end thereof and, except for the presence of said aperture, substantially closes said outer end of said enclosure.

6. The assembly of claim 1 wherein said mounting means includes at least a pair of complementary first and second magnetic elements, said first magnetic element mounted to said surface of said mounting frame, said second magnetic element mounted to the exterior surface of the window pane such that said first and second magnetic elements are alignable with and magnetically attract one another to thereby retain said mounting frame and said enclosure on the exterior surface of the window pane.

7. The assembly of claim 1 wherein said mounting means includes:
   a pair of first strips of magnetic material mounted to said surface of said mounting frame adjacent to upper and lower edges of said mounting frame above and below said viewing portal thereof; and
   a pair of second strips of magnetic material complementary to said first strips of magnetic material being mounted to the exterior surface of the window pane such that said paired first and second strips of complementary magnetic material are alignable with and magnetically attract one another to thereby retain said mounting frame and said enclosure on the exterior surface of the window pane.

8. A method of constructing a bird observatory, comprising the steps of:
   (a) providing a mounting frame defining a viewing portal and having opposite front and rear surfaces;
   (b) fixedly mounting a rear panel to the front surface of the mounting frame such that the rear panel extends across and covers a lower portion of the viewing portal, the rear panel having a plurality of angularly displaced peripheral edges;
   (c) mounting additional panels to the mounting frame and rear panel and to one another using the peripheral edges of the rear panel as guides so as to thereby form an enclosure mounted to the mounting frame and defining an interior cavity within the enclosure for one or more birds to nest within the enclosure, said rear panel in extending across and covering the lower portion of the viewing portal of the mounting frame only partially closing an inner end of the enclosure and thereby leaving an opening above the rear panel being adjacent to and generally parallel with an uncovered upper portion of the viewing portal of the mounting frame at an inner end of the enclosure communicating with the interior cavity of the enclosure and the uncovered upper portion of the viewing portal of the mounting frame; and
   (d) forming an aperture in one of the additional panels of the enclosure in communication with the interior cavity of the enclosure for permitting birds to enter and exit the interior cavity.

9. The method of claim 8 wherein the mounting additional panels includes:
   mounting a bottom panel and a pair of opposite side panels to the rear panel and to the mounting frame using selected ones of the peripheral edges of the rear panel as guides;
   mounting a front panel to the bottom panel and the opposite side panels using peripheral edges of the bottom panel and the opposite side panels as guides; and
   mounting a pair of roof panels to the front panel and to the mounting frame using a peripheral edge of the front panel as a guide.

10. The method of claim 8 wherein the forming the aperture includes providing a plurality of perforated concentric panel segments of varying diameters in one of the additional panels such that the perforated concentric segments are removable to form the aperture having a selected one of varying diameter sizes in communication with the interior cavity for permitting birds below the selected one diameter size to enter and exit the interior cavity.

11. The method of claim 8 further comprising the step of:
   mounting the mounting frame at the rear surface thereof to a support structure to retain the mounting frame and the enclosure on the support structure such that birds within the interior cavity of the enclosure can be seen through the viewing portal of the mounting frame and the opening at the inner end of the enclosure.

12. The method of claim 11 wherein the mounting the mounting frame includes providing complementary magnetic elements on the exterior surface of the mounting frame and exterior surface of a window pane to thereby retain the mounting frame and the enclosure on the exterior surface of the window pane such that birds within the interior cavity of the enclosure can be seen through the window pane via the viewing portal of the mounting frame and the opening of the enclosure.

13. The method of claim 12 wherein the providing of complementary magnetic elements includes providing at least a pair of complementary first and second magnetic elements, the first magnetic element being mounted to the mounting frame, the second magnetic element being mounted to the exterior surface of the window pane such that the first and second magnetic elements are alignable with and magnetically attract one another to thereby retain the mounting frame and the enclosure on the exterior surface of the window pane.

* * * * *